United States Patent
Cho

(10) Patent No.: US 10,654,310 B2
(45) Date of Patent: May 19, 2020

(54) SYNTHETIC CLAY COMPOSITION CONTAINING HOLLOW SPHERE AND METHOD FOR PREPARING THE SAME

(71) Applicant: MCA CO., LTD., Daejeon (KR)

(72) Inventor: Hyun Cho, Daejeon (KR)

(73) Assignee: MCA CO., LTD., Daejeon (KR)

(*) Notice: Subject to any disclaimer, the term of this patent is extended or adjusted under 35 U.S.C. 154(b) by 0 days.

(21) Appl. No.: 15/550,746

(22) PCT Filed: Feb. 15, 2016

(86) PCT No.: PCT/KR2016/001503
§ 371 (c)(1),
(2) Date: Aug. 11, 2017

(87) PCT Pub. No.: WO2016/133325
PCT Pub. Date: Aug. 25, 2016

(65) Prior Publication Data
US 2018/0037052 A1 Feb. 8, 2018

(30) Foreign Application Priority Data

Feb. 17, 2015 (KR) .................. 10-2015-0024431
Feb. 12, 2016 (KR) .................. 10-2016-0016319

(51) Int. Cl.
*C04B 38/00* (2006.01)
*B44C 3/04* (2006.01)
(Continued)

(52) U.S. Cl.
CPC ............... *B44C 3/04* (2013.01); *C04B 26/02* (2013.01); *C04B 33/04* (2013.01); *C04B 38/00* (2013.01); *C08K 5/053* (2013.01); *C08L 101/00* (2013.01)

(58) Field of Classification Search
CPC ........... B44C 3/04; C04B 26/02; C04B 38/00; C04B 33/04; C08K 5/053; C08L 101/00
See application file for complete search history.

(56) References Cited

U.S. PATENT DOCUMENTS

| 5,873,933 A | 2/1999 | Mackey |
| 5,972,092 A | 10/1999 | Cordova |

(Continued)

FOREIGN PATENT DOCUMENTS

| JP | S50-6432 A | 5/1973 |
| JP | H02-123390 A | 5/1990 |

(Continued)

OTHER PUBLICATIONS

Office Action issued by the Korean Intellectual Property Office for related Korean Patent Application No. 10-2017-0143398 dated Dec. 7, 2017.

(Continued)

*Primary Examiner* — Noah S Wiese
(74) *Attorney, Agent, or Firm* — Troutman Sanders LLP; Ryan A. Schneider

(57) ABSTRACT

The present invention relates to a synthetic clay composition which does not harden and thus can be repeatedly shaped without water while maintaining the shape for a long time and, particularly, to a novel synthetic clay composition and a method for preparing the same. The synthetic clay composition is soluble in water, and thus can be easily washed and is highly safe for the human body. Further, the synthetic clay composition is light and can be repeatedly newly shaped as desired. In addition, the synthetic clay composition has an excellent ability to maintain a shape, and thus can maintain the same shape in an agglomerated form for a long time, and can be used for play such as throwing.

20 Claims, 14 Drawing Sheets

(51) Int. Cl.
*C08L 101/00* (2006.01)
*C04B 26/02* (2006.01)
*C04B 33/04* (2006.01)
*C08K 5/053* (2006.01)

(56) References Cited

U.S. PATENT DOCUMENTS

| | | | | |
|---|---|---|---|---|
| 6,235,070 | B1 | 5/2001 | Beermann | |
| 6,676,743 | B2 * | 1/2004 | Yamamuro | C04B 28/001 106/416 |
| 7,781,359 | B2 * | 8/2010 | Yamakawa | C04B 35/465 264/614 |
| 9,192,625 | B1 * | 11/2015 | Joshi | D04H 3/005 |
| 2003/0150361 | A1 * | 8/2003 | Yamamuro | C04B 28/001 106/677 |
| 2007/0100052 | A1 * | 5/2007 | Terry Lee | C08L 91/00 524/451 |

FOREIGN PATENT DOCUMENTS

| | | |
|---|---|---|
| JP | H10-020768 A | 1/1998 |
| JP | H10-268755 A | 10/1998 |
| JP | H11-209156 A | 8/1999 |
| JP | 2001-131329 A | 5/2001 |
| JP | 2001-234081 A | 8/2001 |
| JP | 2002-356365 A | 12/2002 |
| JP | 2002-356366 A | 12/2002 |
| JP | 2003-267773 A | 9/2003 |
| JP | 2007-331971 A | 12/2007 |
| JP | 2008-201966 A | 8/2008 |
| JP | 2009-263504 A | 11/2009 |
| JP | 2012-530956 A | 5/2012 |
| KR | 10-0231408 B1 | 11/1999 |
| KR | 10-2004-0000361 A | 1/2004 |
| KR | 10-0598001 B1 | 7/2006 |
| KR | 10-0619840 B1 | 9/2006 |
| KR | 10-0831831 B1 | 5/2008 |
| KR | 10-0845027 B1 | 7/2008 |
| KR | 10-0874091 B1 | 12/2008 |
| KR | 10-0978692 B1 | 8/2010 |
| KR | 10-1178944 B1 | 8/2012 |
| KR | 10-1462031 B1 | 11/2014 |
| WO | 2007131618 A1 | 11/2007 |

OTHER PUBLICATIONS

Office Action issued by the Korean Intellectual Property Office for related Korean Patent Application No. 10-2016-0016319 dated Dec. 7, 2017.
Office Action issued by the Korean Intellectual Property Office for related Korean Patent Application No. 10-2016-0016319 dated Apr. 10, 2017.
English translation of Office Action issued by the Korean Intellectual Property Office for related Korean Patent Application No. 10-2016-0016319 dated Apr. 10, 2017.
Final Office Action issued by the Korean Intellectual Property Office for related Korean Patent Application No. 10-2016-0016319 dated Aug. 31, 2017.
English translation of Final Office Action issued by the Korean Intellectual Property Office for related Korean Patent Application No. 10-2016-0016319 dated Aug. 31, 2017.
International Search Report and Written Opinion for related International Patent Application No. PCT/KR2016/001503 dated May 18, 2016.
English Translation of International Search Report for related International Patent Application No. PCT/KR2016/001503 dated May 18, 2016.
Office Action for Japanese Patent Application No. 2017-561223 dated Jul. 26, 2018 and English Translation, 9 pages.
Extended European Search Report for European Application No. 16752655.7 dated Jul. 27, 2018, 10 pages.

\* cited by examiner

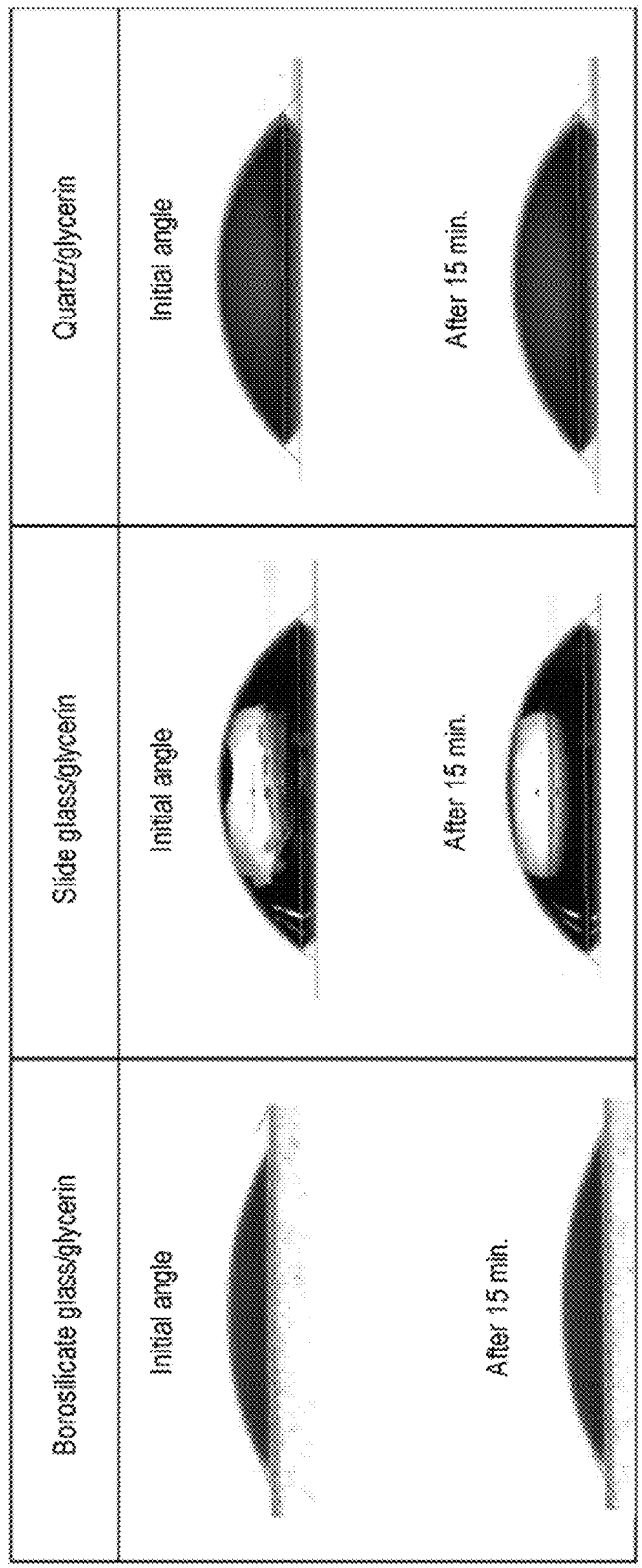

FIG. 4
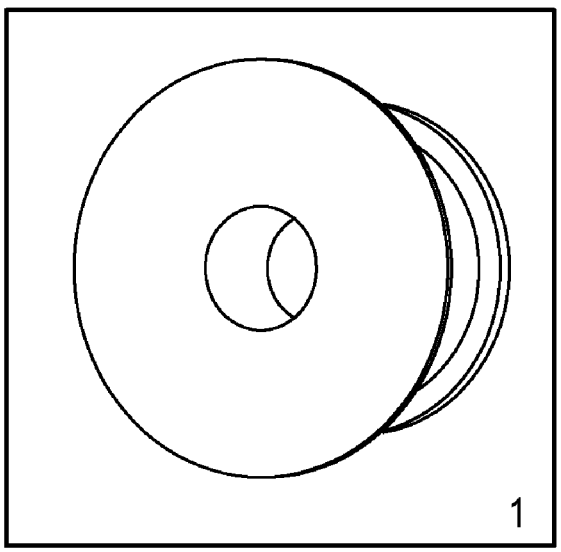
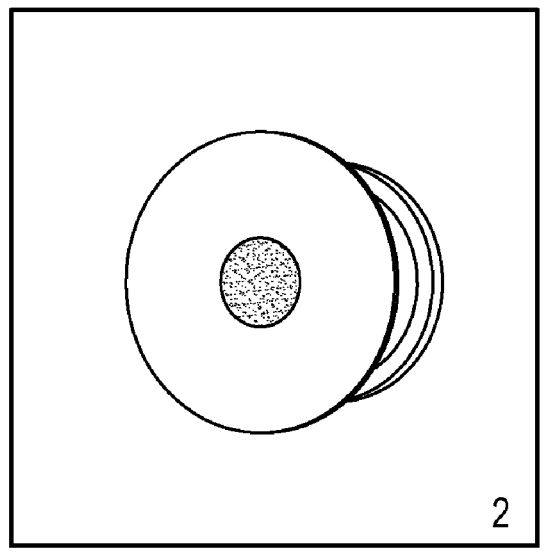
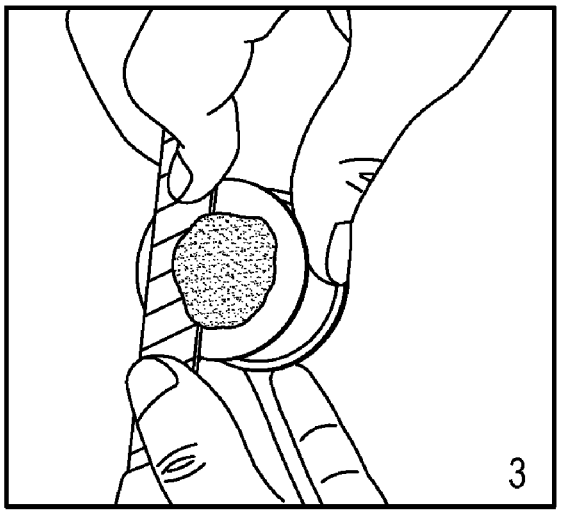
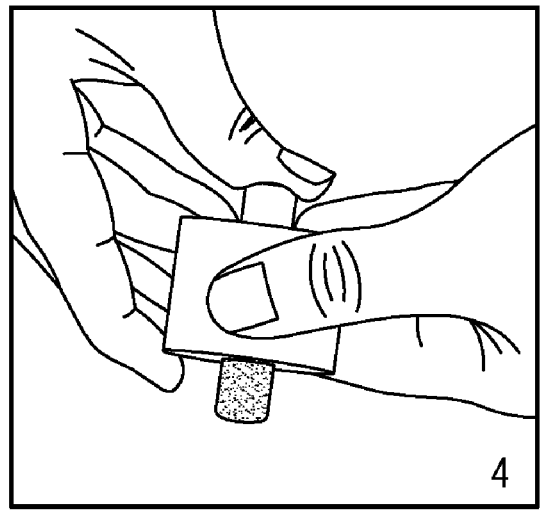

FIG. 5A

| Comparative Example | 1 | 2 | 3 | 4 | 5 | 6 | 7 | 8 | 9 | 10 | 11 | 12 | 13 |
|---|---|---|---|---|---|---|---|---|---|---|---|---|---|
| Pre-drying density (g/cm³) | 1.574428 | 1.541353 | 1.483759 | 1.095951 | 1.290884 | 1.012543 | 1.018013 | 0.910243 | 0.946453 | 0.296266 | 0.282449 | 0.219723 | 0.386859 |
| Post-drying density (g/cm³) | 1.574422 | 1.543249 | 1.483337 | 1.023275 | 1.290505 | 0.981184 | 1.01597 | 0.905506 | 0.936627 | 0.162549 | 0.281653 | 0.055858 | 0.210314 |
| Change before and after drying (%) | -0.0004 | 0.123 | -0.0285 | -6.6313 | -0.0294 | -3.0971 | -0.2006 | -0.5204 | -1.0382 | -45.134 | -0.2818 | -74.5779 | -45.6356 |

| Working Example | A10 | A11 | A12 | B10 | B11 | B12 | C10 | C11 | C12 | D13 | D14 | D15 | |
|---|---|---|---|---|---|---|---|---|---|---|---|---|---|
| Pre-drying density (g/cm³) | 0.205718 | 0.293125 | 0.343023 | 0.296222 | 0.309365 | 0.282586 | 0.457703 | 0.47772 | 0.444853 | 0.075738 | 0.086304 | 0.069165 | |
| Post-drying density (g/cm³) | 0.200091 | 0.294538 | 0.331818 | 0.287963 | 0.298424 | 0.27656 | 0.451753 | 0.472825 | 0.437874 | 0.070106 | 0.084746 | 0.069513 | |
| Change before and after drying (%) | -2.7353 | 0.482 | -3.2665 | -2.7813 | -3.5368 | -2.1324 | -1.3001 | -1.0248 | -1.5687 | -7.4368 | -1.8052 | 0.5026 | |

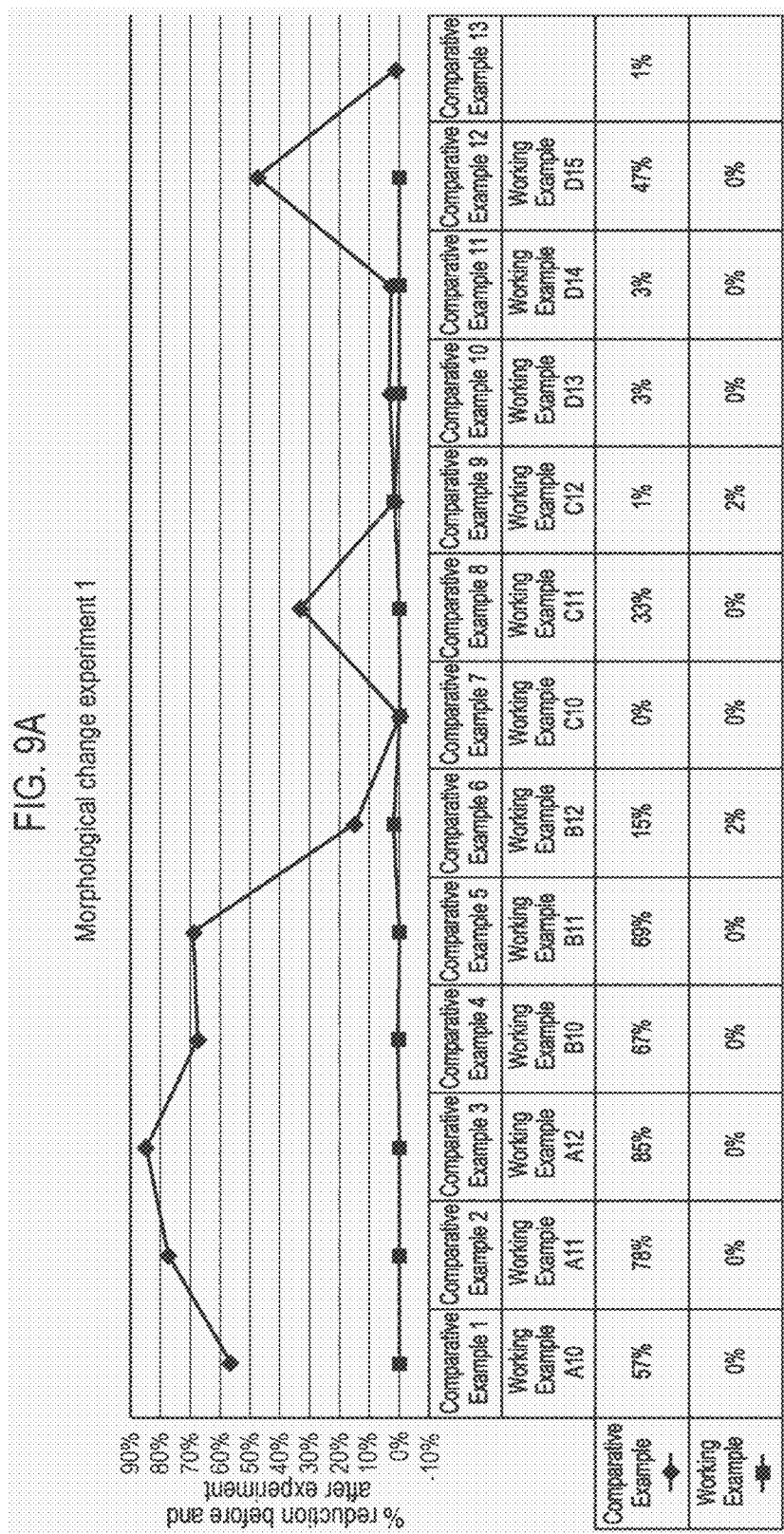

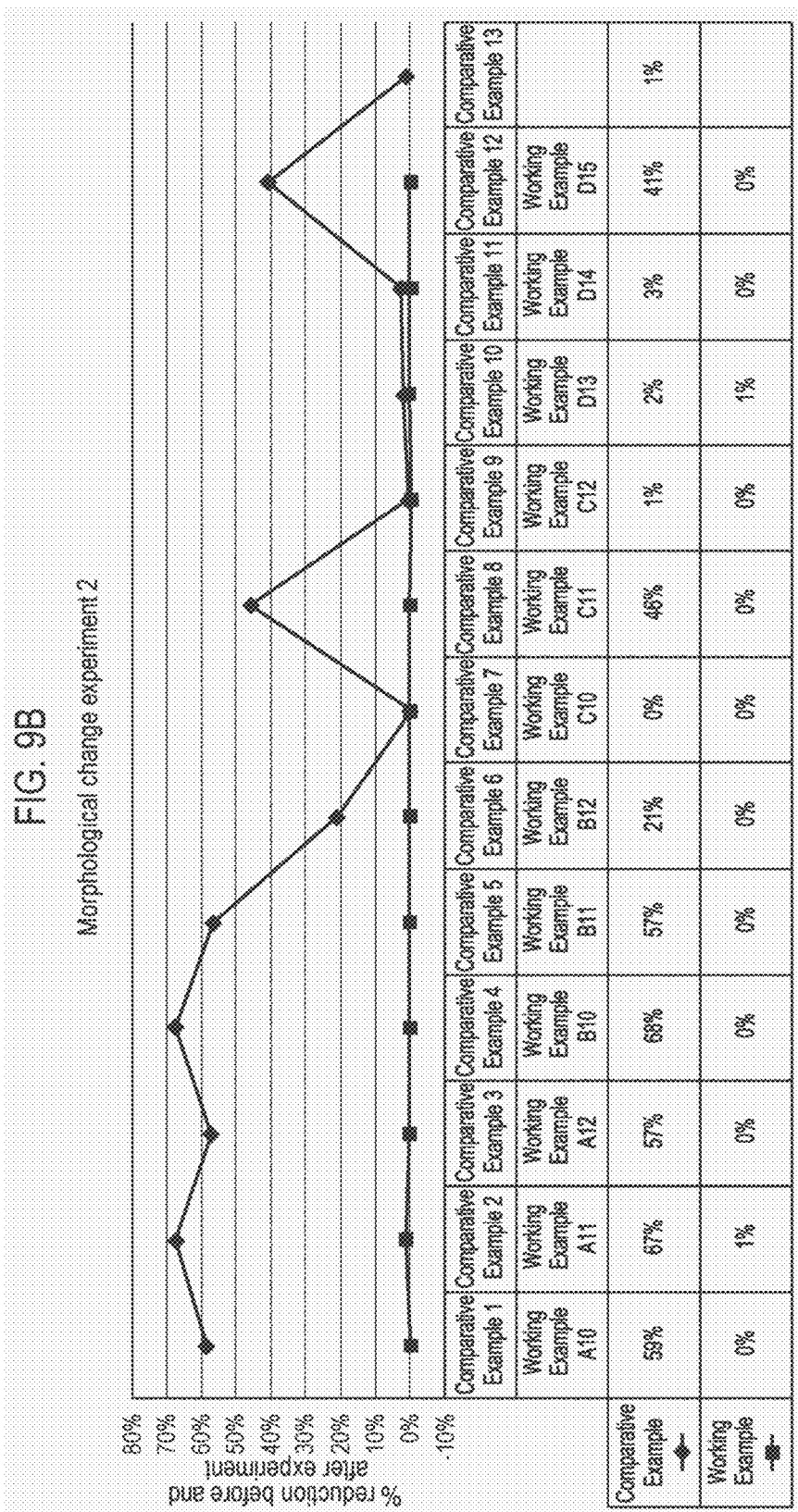

SYNTHETIC CLAY COMPOSITION CONTAINING HOLLOW SPHERE AND METHOD FOR PREPARING THE SAME

TECHNICAL FIELD

The present invention relates to a synthetic clay composition which does not harden and thus can be repeatedly shaped without water while maintaining the shape for a long time and, particularly, to a novel synthetic clay composition and a method for preparing the same, the synthetic clay composition being soluble in water so as to be easily washed, being highly safe for the human body, being light, being able to be repeatedly newly shaped as desired, having such an outstanding shape retention potential so as to maintain a molded shape for a long time as it is, and being able to be used for play such as throwing.

BACKGROUND ART

Many techniques about the use of synthetic sand and clay for play or education, instead of natural sand and clay, have been introduced. Disclosed is a molding composition for handcraft in Korean Patent No. 231408, a method for manufacturing viscous sand and the use thereof in stereostatic learning in Korean Patent Publication No. 2004-361, viscous sand and a method for producing the same in U.S. Pat. No. 6,235,070, a sand material mixture and a method for producing the same in Korean Patent No. 598001, a malleable play material compound resembling loose soil in U.S. Pat. No. 5,873,933, and a functional synthetic clay capable of being naturally cured and releasing scent upon pressing in Korean Patent Publication No. 2006-11619.

A brief description of each of these references is given below. The molding composition for handcraft of Korean Patent No. 231408 is prepared by blending water, salt, flour powder, starch, stone dust, aluminum sulfate, oil, borax, magnesium chloride, sodium benzoate, titanium oxide, and dye at an appropriate ratio, followed by stirring, and heating and forming, whereby the composition has the advantage of being easily kneaded even with a small amount of water, can be prevented from freezing and putrefaction, is capable of maintaining moisture, and is nice to touch due to flour powder and starch.

Korean Patent Publication No. 2004-361 pertains to a method for manufacturing viscous sand which can repeatedly be molded and dispersed according to a degree of force applied thereto. In the method, 80 to 90% by weight of sand is heated to 75 to 90° C., fed with 0.5 to 3.5% by weight of carnauba, and mixed while the temperature is maintained until the carnauba is melted to coat the sand. Then, 8 to 12% by weight of beeswax and 1.5 to 4.5% by weight of lanolin are added to the coated sand and maintained at 55 to 70° C. so that the beeswax and lanolin are melted to coat the sand therewith, after which the sand is slowly cooled.

The viscous sand of U.S. Pat. No. 6,235,070 and the sand material mixture of Korean Patent No. 598001 are common in that they comprise sand grains and a binder. The binder forms a coating on the sand grains and is selected from the group consisting of beeswax, ceresin wax, microcrystalline wax, and a mixture of ozokerite and paraffin wax. These sand material mixtures can be used as toy materials, education materials, and materials for simulated architectural design and landscape architecture in museums and aquariums, etc.

The malleable play material compound resembling loose soil of U.S. Pat. No. 5,873,933 comprises a malleable amorphous binder and a quantity of sand. The binder comprises soluble cellulose, polyvinyl alcohol, propylene glycol, water, sodium borate, and sodium carbonate. The mixture in which the malleable binder is combined with a great quantity of sand has an unusual tactile characteristic and a granular malleable amorphous property.

In addition, the functional synthetic clay capable of being naturally cured and releasing scent upon pressing, disclosed in Korean Patent Publication No. 2006-11619, is prepared by mixing polyvinyl alcohol and ethylene vinyl acetate as base materials, polyacrylonitrile powder and heat-expandable microspheres which are hollow spheres having low density as fillers, a thickener, glycerin, a retarder, and other additives at room temperature and elevated temperatures.

However, the above-mentioned, conventional viscous sand or synthetic clay were unable to attract or draw attentions from infants and children because they are substantially similar in physical and morphological properties to preexisting sand, sand with moisture or paraffin-coated oily sand, natural clay, etc. Further, such conventional sand or clay required water for its use or allowed only limited molding activities. In addition, even in case where they could be molded, conventional sand or clay were solidified with time and thus could not be repetitively used. Except for being kept as an artwork, the solidified, molded sand or clay was discarded, causing environmental pollution. Particularly, paraffin-coated viscous sand were problematic in that the paraffin would smear on floors, hands, cloths, etc., causing significant inconvenience, made it difficult to separate bacteria and dust therefrom when bacteria and dust were stuck at the sand or clay, easily putrefied to emit odors, and gave an unpleasant sticky tactile feel.

With these problems in mind, the present applicant developed air clay, which was substantially different in tactile feel and properties from conventional viscous sand or synthetic clay and could be repetitively used even without water. The air clay was registered as Korean Patent Nos. 10-0874091 and 10-1178944. Korean Patent No. 10-0874091 discloses air clay comprising a base material such as sand dust prepared by finely grinding sand and glycerin. When pulled, the air clay is stretched with the concomitant absorption of air there into, thereby becoming loose and soft like clouds, cotton, or snow. On the other hand, when agglomerated by force, the air clay returns back to dense, rigid clay shape while the absorbed air is released. Thus, the air clay overcomes various problems and limitations the conventional viscous sand or synthetic clay has. Korean Patent No. 10-1178944 describes an improved clay composition that has various properties so that it is utilized for various purposes and is modified in surface and physical properties so that it is imparted with functionality such as antibacterial activity. This clay composition comprises porous diatomite powder (first base material) and an amphipathic, that is, a hydrophilic and lipophilic liquid material, and optionally a second base material, smaller in size than the first base material, endowing various properties.

Both the air clay and the improved clay composition, developed by the present applicant, can be repetitively molded without water and can maintain constant physical properties for a long period of time without being hardened. While the air clay and composition developed by the present applicant retains properties that cannot be found in conventional clay and synthetic clay compositions, these patented inventions do not have a shape retention potential enough to maintain a molded shape as it is for a long time or to facilitate play such as throwing with agglomerates of the clay.

Hollow spheres, which are globular particles with a vacant interior, are low in density. Generally, plastic hollow spheres composed of organic polymers are widely known. Recent active research has diversified kinds of hollow sphere materials such as ceramic hollow spheres, metal hollow spheres, etc. Among them, hollow glass spheres made of the glass ingredient silica have attracted intensive attention because of their low density and excellent flame resistance and heat insulation. They are commercially manufactured on a mass scale by, for example, 3M, Emerson, etc. Hollow glass spheres find applications as a high-strength, low-density additive in a variety of materials such as resins, structural foam, elastomers, etc. Hollow glass spheres are commercially available such as those sold by Sinosteel Maanshan New Material Technology Co., Ltd., China, in the trade name of 'Hollow Glass Microspheres', which is made of soda-lime borosilicate glass; by 3M, U.S.A. in the trade name of 'Glassbubbles'; and by Potters Industries LLC, U.S.A. in the name of 'Q-Cel®'.

DETAILED DESCRIPTION OF THE INVENTION

Technical Problem

The purpose of the present invention is to provide a synthetic clay composition having new properties of being water soluble enough to be easily washed, being very safe to the human body, being very light, being able to be repeatedly molded for a long period of time without water, and having an excellent shape retention potential enough to maintain a molded shape without change for a long time or to enable play such as throwing with agglomerates of the clay, and a preparation method thereof.

Technical Solution

To accomplish the purpose, the present invention provides a synthetic clay composition that is water soluble and ranges in density from greater than 0 g/cm$^3$ to 0.6 g/cm$^3$ with a density change of 10% or less before and after a drying test. The synthetic clay composition preferably ranges in density from greater than 0 g/cm$^3$ to 0.4 g/cm$^3$ and more particularly from greater than 0 g/cm$^3$ to 0.2 g/cm$^3$.

The synthetic clay composition of the present invention exhibits a weight change of about 2% or less, particularly about 1% or less, and more particularly about 0% before and after a morphological change experiment.

The synthetic clay composition of the present invention may comprise hollow spheres and a liquid material capable of being kneaded together with the hollow spheres. The hollow spheres are particularly hollow glass spheres. The hollow glass spheres particularly have a density from greater than 0 g/cm$^3$ to 0.6 g/cm$^3$, and more particularly from greater than 0g/cm$^3$ to 0.4 g/cm$^3$. In another embodiment of the present invention, the hollow spheres are plastic hollow spheres. The liquid material may comprise glycerin.

The synthetic clay composition of the present invention may particularly further comprises a coagulant.

The synthetic clay composition of the present invention may further comprise an antibacterial material as needed.

Also, the present invention provides a method for preparing a synthetic clay composition, comprising the steps of mixing hollow spheres with a liquid material able to be kneaded together with hollow spheres and kneading the mixture sufficiently until the mixture reaches a stable homogeneous phase.

The preparation method of the present invention may further comprise the steps of adding a coagulant in combination with the liquid material to the hollow spheres and mixing them.

The preparation method of the present invention may further comprise the steps of adding an antibacterial material to the liquid material, as needed and dissolving the antibacterial material prior to mixing.

As used herein, the term "clay" refers to an aggregate of fine particles, covering all clay properties such as moldable clay and viscous mud, malleable sand that disperses when touched, and aggregates of fine powders.

Effects of the Invention

The novel synthetic clay composition of the present invention is water soluble enough to be easily washed, is very safe to the human body, and very light. In addition, after being molded into a shape, the novel synthetic clay keeps its property with almost no mass changes even when it is left for a long period of time, and thus can be repeatedly molded for a long period of time without water. Further, the synthetic clay composition has an excellent shape retention potential to facilitate play such as throwing with ball-like agglomerates of the clay. Thus, the synthetic clay composition of the present invention can be utilized not only as play clay with which children repeatedly try to make various moldings, but also in new play such as ball games, ball fights, etc. because children can agglomerate the synthetic clay composition and throw it. Moreover, because the synthetic clay composition of the present invention has an excellent shape retention potential, the article molded from the clay composition can remain intact for a long period of time. Accordingly, the synthetic clay composition may be used for molding and modeling of exhibition works and art works that should be exhibited for a long period of time. Being very light, the synthetic composition may be made into sculptures that can be installed anywhere.

BRIEF DESCRIPTION OF THE DRAWINGS

FIG. 3 shows photographic images illustrating contact angles of glycerin with regard to borosilicate glass, slide glass, and quartz.

FIG. 4 shows schematic diagrams accounting for a preparation process of a sample used for the measurement of the synthetic clay composition.

FIGS. 5A and 5B are respectively a table and a graph showing densities of synthetic clay compositions according to Working Examples and Comparative Examples before and after a drying test.

FIGS. 9A and 9B are graphs showing results of a morphological change experiment conducted on synthetic clay compositions according to the Working Examples and Comparative Examples.

MODE FOR CARRYING OUT THE INVENTION

Figure 1A:
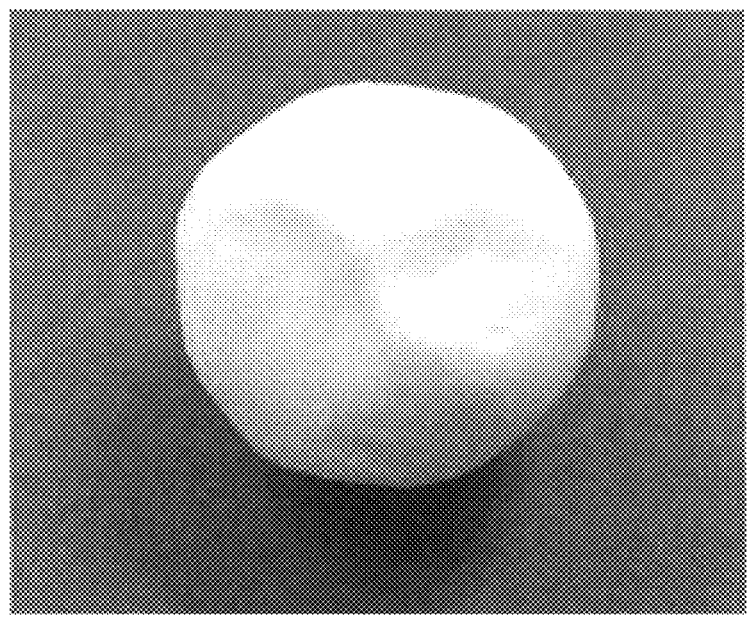
FIGS. 1A to 1F are various photographic images of a synthetic clay composition according to an embodiment of the present invention.
Figure 1B:
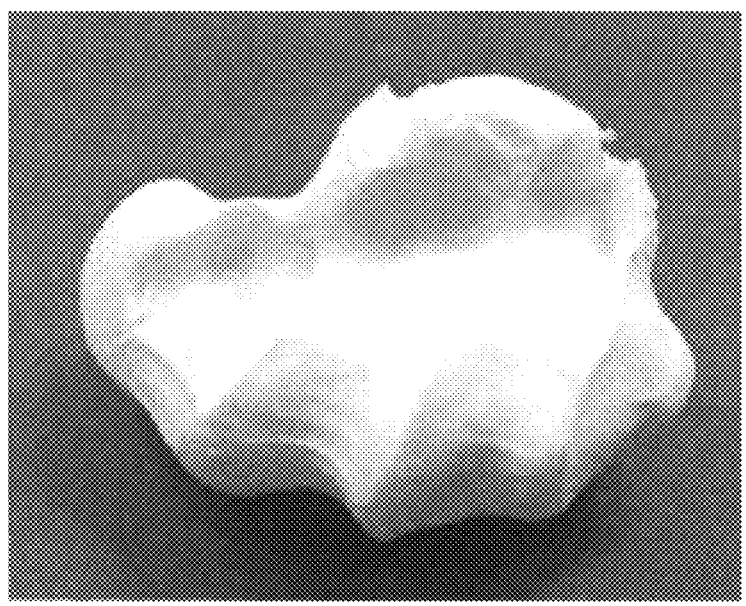
Figure 1C:
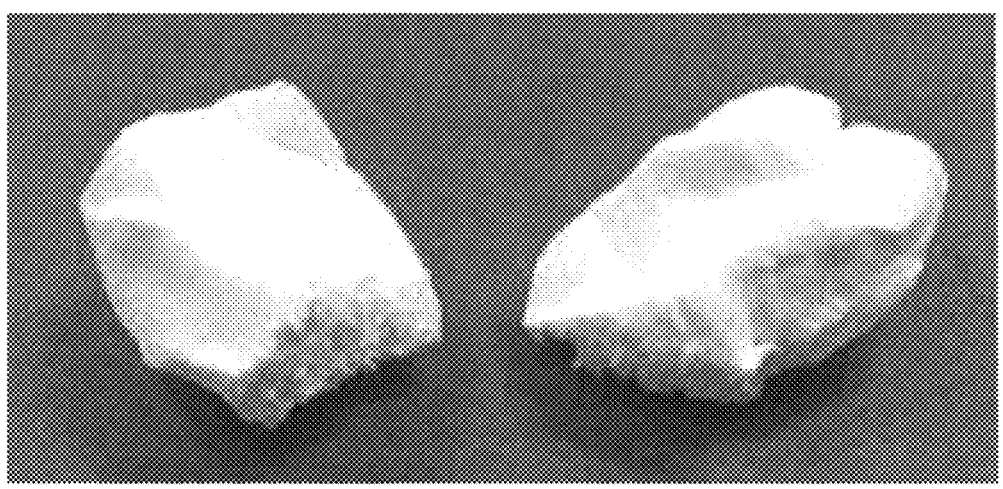
Figure 1D:
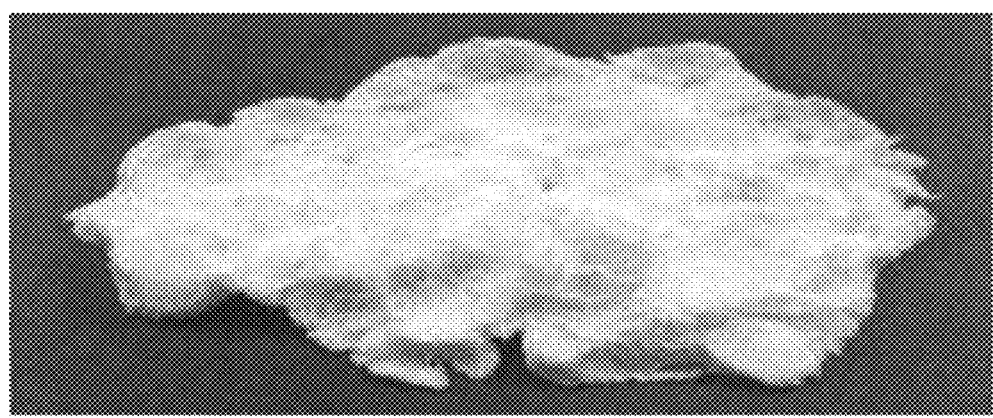
Figure 1E:
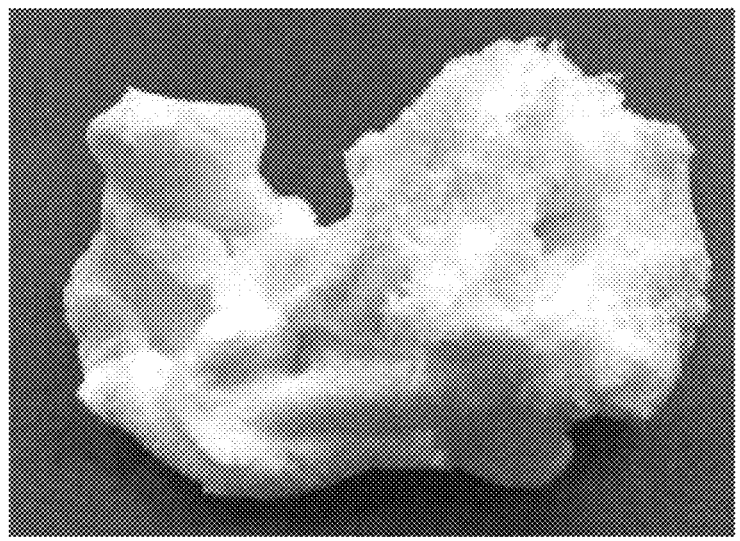
Figure 1F:
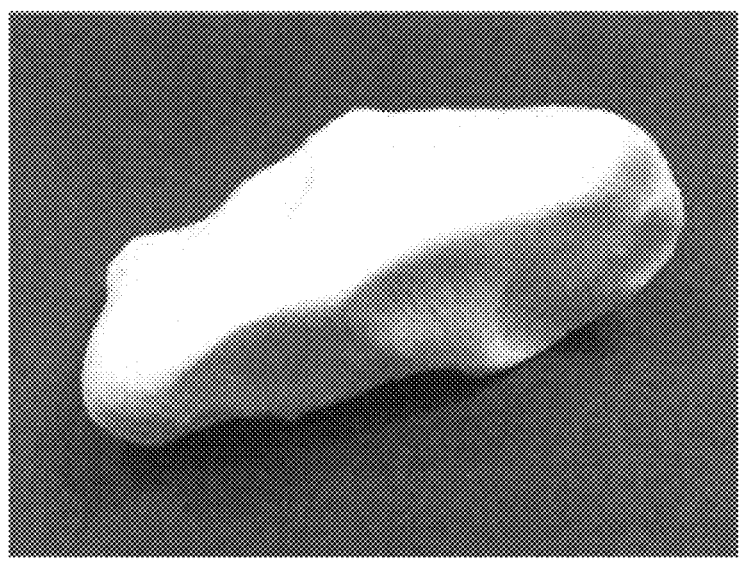

Below, a description is given of a novel synthetic clay composition and a method for preparing the same in accordance with the present invention. The technical configurations to be described hereinafter are merely preferable embodiments of the present invention, and do not cover all of the technical spirit of the present invention. Thus, it is to be understood that various equivalents and modifications capable of replacing them may exist at the time of application of the present invention.

Synthetic Clay Composition of the Present Invention

The synthetic clay composition of the present invention is soluble in water (hydrophilic) enough to be easily washed and highly safe to the human body.

Also, the synthetic clay composition of the present invention is very light, ranges in density from greater than 0 $g/cm^3$ to 0.6 $g/cm^3$, particularly from greater than 0 $g/cm^3$ to 0.4 $g/cm^3$, and more particularly from greater than 0 $g/cm^3$ to 0.2 $g/cm^3$.

Also, the synthetic clay composition of the present invention shows a density change of about 10%, particularly about 8%, and more particularly about 4% before and after a drying test (drying at 25° C. for 96 hours). In order to be repetitively molded without water and maintain constant physical properties for a long period of time without being hardened, it is desirable that a clay composition should undergo little density change attributed to the vaporization of some components in the clay composition even when it is long dried or left unattended.

Also, the synthetic clay composition of the present invention has a weight change of 2% or less before and after a morphological change experiment. This means that in the course of playing therewith, the clay composition well agglomerates without producing dust and the molding of the clay composition is unlikely to crumble by external force.

The synthetic clay composition of the present invention comprises hollow spheres. The hollow spheres are globular particles with a vacant interior and are of low density. There are hollow particles of various materials such as plastic, glass, ceramic, metal, etc., known thus far.

The synthetic clay composition of the present invention may comprise hollow glass spheres as the hollow spheres. Hollow glass spheres, known as a material having a low density and excellent flame resistance and heat insulation, are used as an additive for various resins, foams, elastomers, etc. Hollow glass spheres are manufactured on mass scales by 3M, Emerson, etc. In the present invention, commercially available hollow glass spheres may be employed. In one embodiment of the present invention, 'Hollow Glass Microspheres H Series', which is hollow glass spheres made of soda-lime borosilicate glass, manufactured by Sinosteel Maanshan New Material Technology Co., Ltd., was used. As they are of lower density, hollow glass spheres are lighter than other types. The hollow glass spheres used in the present invention have a density of greater than 0 $g/cm^3$ to 0.6 $g/cm^3$. Hollow glass spheres with a lower density have the advantage of producing a lighter product, but suffer from the disadvantage of increased cost. In the present invention, selection may be made of hollow glass spheres having an appropriate density within the said range, as needed. In order to prepare light synthetic clay, hollow glass spheres particularly having a density of from greater than 0 $g/cm^3$ to 0.4 $g/cm^3$ and more particularly from greater than 0 $g/cm^3$ to 0.2 $g/cm^3$ may be used. The synthetic clay composition of the present invention employing the hollow glass spheres are flame resistant and exhibit good plasticity, high rigidity, and an environment-friendly property of being safe for the human body.

In another embodiment of the present invention, plastic hollow spheres may be used as the hollow spheres. Plastic hollow spheres enjoy the advantage of being much lighter than other types and basically have a 10-fold smaller density than hollow glass spheres. Having far lower flash point than that of hollow glass spheres, however, plastic hollow spheres (average flash point of approximately 200° C.) must be mixed with a large quantity of liquid material to increase the flash point to the extent that children can safely play therewith. In addition, when plastic hollow spheres are used to prepare a synthetic clay composition, a flame retardant may be added in order to decrease the flammability of the synthetic clay composition. The amount of the flame retardant may be adjusted depending on the desired degree of reduction in flammability and is particularly about 50 parts by weight or greater, based on the total weight of the synthetic clay composition, exclusive of the flame retardant. Meanwhile, plastic hollow spheres are advantageous in terms of high elasticity.

The synthetic clay composition of the present invention may employ various hollow spheres, which are globular particles with a vacant interior and are of low density without limitations to material types, including ceramic hollow spheres and metal hollow spheres as well as hollow glass spheres or plastic hollow spheres.

The synthetic clay composition of the present invention comprises a liquid material capable of being kneaded together with the hollow spheres. The liquid material useful in the present invention may have a density higher than that of the hollow spheres and a viscosity of 0.1 to 1,500 cP (=mPas). The liquid material useful in the present invention can be completely mixed and kneaded along with hollow spheres to form a stable homogeneous phase. In this regard, if the liquid material is highly reactive to the surface of the hollow spheres, the hollow spheres and the liquid material are mixed and kneaded to form a stable homogeneous phase, meaning that the liquid material is constantly deposited on the hollow spheres, and thus independent hollow spheres are difficult to observe. However, the liquid material, unless highly reactive to the surface of the hollow spheres, is deposited only on a part of the surface of the hollow spheres or is not deposited at all. In this case, hollow spheres are independently observed, reflecting the problem that the kneading is improperly completed such that there is no increase in the viscosity of the clay composition even when an additional amount of the liquid material is added. When the surface of the hollow spheres is lipophilic, a lipophilic liquid material is suitable. On the other hand, a hydrophilic liquid material is suitable for a hydrophilic surface of the hollow spheres.

The liquid material may be, for example, propylene glycol, polyethylene glycol, polyvinyl alcohol, boric acid, an aqueous adhesive (e.g., PVAc, etc.), a rubber adhesive, paraffin, liquid paraffin, wax, glycerin, gelatin, viscous oil, a combination thereof, or a mixture thereof with water.

The synthetic clay composition of the present invention may particularly comprise hollow glass spheres in an amount of about 50 to about 95% by weight and a liquid material in an amount of about 4 to about 50% by weight, based on the total weight thereof. Also, the synthetic clay composition of the present invention may comprise plastic hollow spheres in an amount of about 10 to about 65% by weight and a liquid material in an amount of about 30 to about 80% by weight, based on the total weight thereof (flame retardant exclusive if present). If the content of the liquid material is too small relative to that of hollow spheres, weight sensation and viscosity are decreased and a user's hands are apt to be coated with powder. On the other hand, too large a content of the liquid material relative to that of hollow spheres increases weight sensation and may cause the user's hands to be coated with liquid or both liquid and powders.

The synthetic clay composition of the present invention may particularly further comprise a coagulant. A coagulant is an agent that is added to liquid to induce solid particles suspended in the liquid to aggregate into small lumps. Examples of the coagulant include inorganic electrolytes such as slaked lime, alum, aluminum chloride, iron oxide (III), iron sulfate (II), etc., and organic polymers, such as starches, and polyacrylamide and derivatives thereof. Both the inorganic electrolytes and the organic polymers may be used, with preference for organic polymers such as polyacrylamide and derivatives thereof. When a coagulant is added thereto, a composition in which the hollow spheres and the liquid material form a homogeneous phase with the liquid material serving as a medium becomes a thicker emulsion that is thick and strongly viscous. The synthetic clay composition of the present invention may comprise a coagulant in an amount of greater than 0% by weight to about 10% by weight on the basis of the total weight thereof (flame retardant exclusive if present).

The synthetic clay composition of the present invention may further comprise an antibacterial agent as needed. The antibacterial agent may particularly be a natural antibacterial material. The natural antibacterial material may be, for example, silver products including silver ions, silver nanoparticles, etc.; a grapefruit extract; a garlic extract containing allicin; or a green tea extract, and at least one selected from the group consisting of the natural antibacterial materials may be contained in the composition. As used herein, the term "silver" means a silver product including silver ions, silver nanoparticles, etc. The antibacterial material may be contained in an amount sufficient to exert antibacterial activity. Depending on types of the antibacterial material, the content of the antibacterial material in the composition may vary. A higher content of the antibacterial agent exhibits better antibacterial effects and persistency, but increases the production cost. Accordingly, it is preferable that a maximum antibacterial effect would be elicited with a minimum amount of antibacterial materials. More particularly, silver ions are used as an antibacterial material. When silver ions are used, they may more particularly be impregnated into a porous substance. For this, the porous substance may be diatomite, zeolite, or perlite. When a porous substance into which silver ions are impregnated is contained in an amount of about 0.5% by weight or greater of the total weight thereof (flame retardant exclusive if present), the composition can exert and maintain antibacterial activity at a level of 94% or higher. More particularly, the antibacterial material may be contained in an amount of about 0.5 to about 10% by weight based on the total weight of the composition (flame retardant exclusive if present). As for a grapefruit extract (DF-100™) as an antibacterial agent, its content may particularly range from about 0.1 to about 10% by weight, based on the total weight of the composition (flame retardant exclusive if present). In this regard, the grapefruit extract is readily dissolved in the liquid material and thus may particularly be contained as a solution in the liquid material in the composition of the present invention.

The synthetic clay composition of the present invention may further comprise an additive such as a property modifier, a colorant, a flavoring agent, etc.

Preparation Method of Synthetic Clay Composition of the Present Invention

Hereinafter, particular embodiments for a method for preparing the synthetic clay composition of the present invention are explained. Individual ingredients are as described above in the synthetic clay composition and a description thereof will be omitted if overlapped.

The preparation method of the present invention comprises the steps of mixing hollow spheres with a liquid material able to be kneaded along with hollow spheres and kneading the mixture sufficiently until the mixture reaches a stable homogeneous phase. In this context, a coagulant may be added in combination with the liquid material to the hollow spheres and mixed. Also, as needed, an antibacterial material, and an additive may be added to and dissolved in the liquid material before mixing and kneading with the hollow spheres. When plastic hollow spheres are used, a flame retardant may be further added. The flame retardant may be added in an appropriate step as required. For instance, the flame retardant may be added alone or in combination with the liquid material after the liquid material is mixed with the hollow spheres, or may be dissolved in the liquid material and then mixed with the hollow spheres.

The hollow spheres are added with the liquid material and optionally with other additives and then kneaded to complete incorporation there between, thereby affording synthetic clay in which the different ingredients form a stable homogeneous phase. Particularly, individual ingredients are admixed and then transferred to a kneader. At this time, a coagulant is added so that the resulting mixture becomes an entirely thickened emulsion that is thicker and strongly viscous. If necessary, a pigment such as a fluorescent, a thermochromic dye, a phosphorescent, etc. or an additional functional agent such as a coating agent (liquid paraffin, wax, etc.) for providing a smooth touch sensation may be admixed with the liquid material after or before the kneading step.

EXAMPLES

A better understanding of the present invention may be obtained through the following working examples which are set forth to illustrate, but are not to be construed as limiting the present invention.

Working Example A1

Based on the total weight of the composition, 20.0 g of hollow glass spheres having a density of 0.2 g/cm$^3$, 35.0 g of a liquid material, and 3.0 g of a coagulant were mixed and kneaded to obtain a synthetic clay composition. The hollow glass spheres were "Hollow Glass Microspheres H20" (manufactured by Sinosteel Maanshan New Material Technology Co., Ltd., China), made of soda-lime borosilicate glass, having a density of 0.2 g/cm$^3$. Glycerin was used as the liquid material. As the coagulant, the organic polymer "HANFLOC (POLYACRYLAMIDE EMULSION) HA-Series" (manufactured by Hansol Chemical, Korea) was used. The molded matter of the resulting synthetic clay composition maintained its shape as it was when it was molded into a sculpture and even when it was molded into balls and used for throwing.

Working Examples A2 to A9

Synthetic clay compositions were prepared in the same manner as in Working Example A1, with the exception that ingredients were mixed as shown in Table 1, below.

TABLE 1a

| Working Ex. | Hollow Glass Sphere Wt. (g) | Wt. % | Glycerin Wt. (g) | Wt. % | Coagulant Wt. (g) | Wt. % | Total Wt. | Commerciality | Remark |
|---|---|---|---|---|---|---|---|---|---|
| A1 | 20.0 | 34.5 | 35.0 | 60.3 | 3.0 | 5.2 | 58.0 | Poor | Molding and playing possible, but liquid smeared on the hand, sticky sensation |
| A2 | 20.0 | 40.8 | 26.0 | 53.1 | 3.0 | 6.1 | 49.0 | Poor | Molding and playing possible, but liquid smeared on the hand, slippery sensation |
| A3 | 20.0 | 50.0 | 17.0 | 42.5 | 3.0 | 7.5 | 40.0 | Moderate poor | Molding and playing possible, but liquid smeared on the hand, slightly slippery |
| A4 | 20.0 | 60.6 | 10.0 | 30.3 | 3.0 | 9.1 | 33.0 | Moderate good | Suitable, but somewhat strong viscous sensation, liquid smeared when continued to be touched |
| A5 | 24.0 | 64.9 | 10.0 | 27.0 | 3.0 | 8.1 | 37.0 | Good | Outstanding commerciality, viscosity suitable, liquid smeared slightly |
| A6 | 20.0 | 69.9 | 7.0 | 24.5 | 1.6 | 5.7 | 28.6 | Moderate good | Viscosity dropped after Ex. A5, an increased amount of powder coated on the hand |
| A7 | 23.0 | 80.4 | 4.6 | 15.9 | 1.1 | 3.7 | 28.6 | Moderate | Viscosity decreased, a high degree of crumbling upon use |
| A8 | 20.1 | 89.1 | 2.0 | 8.9 | 0.5 | 2.1 | 22.6 | Poor | Viscosity decreased, light, the problem of crumbling and cleaning is of concern |
| A9 | 24.0 | 94.1 | 1.0 | 3.9 | 0.5 | 2.0 | 25.5 | Poor | Crumbling and producing dust is of concern |

Working Examples B1 to B9

Synthetic clay compositions were prepared in the same manner as in Working Example A1, with the exception that 'Hollow Glass Microspheres H40' (manufactured by Sinosteel Maanshan New Material Technology Co., Ltd., China) having a density of 0.4 g/cm$^3$ were used as the hollow glass spheres, and the ingredients were used as shown in Table 1b, below.

TABLE 1b

| Working Ex. | Hollow glass sphere Wt. (g) | Wt. % | Glycerin Wt. (g) | Wt. % | Coagulant Wt. (g) | Wt. % | Total Wt. | Commerciality | Remark |
|---|---|---|---|---|---|---|---|---|---|
| B1 | 100.0 | 35.1 | 171.0 | 60.0 | 14.2 | 5.0 | 285.2 | Poor | State just before glutinous phase |
| B2 | 100.0 | 40.4 | 132.5 | 53.5 | 15.0 | 6.1 | 247.5 | Poor | Not glutinous phase, but very highly viscous, gummy properties |
| B3 | 100.0 | 50.0 | 84.0 | 42.0 | 16.0 | 8.0 | 200.0 | Poor | Viscosity decreased somewhat compared to Ex. B2, gummy property, liquid smeared |
| B4 | 100.0 | 60.0 | 50.0 | 30.0 | 16.6 | 10.0 | 166.6 | Moderate poor | Gummy, better tactile sensation than Ex. B2 & B3, squashy sensation, sticky liquid smeared |
| B5 | 100.0 | 65.0 | 41.5 | 27.0 | 12.3 | 8.0 | 153.8 | Moderate | Like highly viscous clay, liquid smeared on the hand, sticky |
| B6 | 100.0 | 70.0 | 35.7 | 25.0 | 7.1 | 5.0 | 142.8 | Moderate | Strong viscosity, slippery sensation, liquid smeared |

TABLE 1b-continued

| Working Ex. | Hollow glass sphere Wt. (g) | Wt. % | Glycerin Wt. (g) | Wt. % | Coagulant Wt. (g) | Wt. % | Total Wt. | Commerciality | Remark |
|---|---|---|---|---|---|---|---|---|---|
| B7 | 100.0 | 80.0 | 20.0 | 16.0 | 5.0 | 4.0 | 125.0 | Good | Suitable viscosity, liquid not smeared, powder coated hands |
| B8 | 100.0 | 90.1 | 8.8 | 7.9 | 2.2 | 2.0 | 111.0 | Good | Drastic decrease of viscosity compared to Ex. B7, crumbling of concern, but having commerciality, powder coated hands rather than liquid |
| B9 | 100.0 | 95.1 | 4.2 | 4.0 | 1.0 | 1.0 | 105.2 | Moderate | Viscosity decreased, crumbling, excessive powder coating |

Working Examples B13 to B21

Synthetic clay compositions were prepared in the same manner as in Working Example A1, with the exception that 'Hollow Glass Microspheres H46' (manufactured by Sinosteel Maanshan New Material Technology Co., Ltd., China) having a density of 0.46 g/cm³ were used as the hollow glass spheres, and the ingredients were used as shown in Table 1c, below.

TABLE 1c

| Working Ex. | Hollow glass sphere Wt. (g) | Wt. % | Glycerin Wt. (g) | Wt. % | Coagulant Wt. (g) | Wt. % | Total Wt. | Commerciality | Remark |
|---|---|---|---|---|---|---|---|---|---|
| B13 | 100.0 | 35.1 | 171.0 | 60.0 | 14.2 | 5.0 | 285.2 | Poor | Glutinous phase (stretchy) |
| B14 | 100.0 | 40.4 | 132.5 | 53.5 | 15.0 | 6.1 | 247.5 | Poor | Very sticky, gummy (damp) |
| B15 | 100.0 | 50.0 | 84.0 | 42.0 | 16.0 | 8.0 | 200.0 | Poor | Sticky gummy (less damp than Ex. B14) |
| B16 | 100.0 | 60.0 | 50.0 | 30.0 | 16.6 | 10.0 | 166.6 | Moderate poor | Somewhat better than gummy state, liquid smeared significantly |
| B17 | 100.0 | 65.0 | 41.5 | 27.0 | 12.3 | 8.0 | 153.8 | Moderate poor | Strong viscous clay, liquid smeared significantly |
| B18 | 100.0 | 70.0 | 35.7 | 25.0 | 7.1 | 5.0 | 142.8 | Moderate good | Tender sensation, liquid smeared significantly |
| B19 | 100.0 | 80.0 | 20.0 | 16.0 | 5.0 | 4.0 | 125.0 | Moderate good | Unique slippery sensation, good viscosity, liquid smeared significantly |
| B20 | 100.0 | 90.1 | 8.8 | 7.9 | 2.2 | 2.0 | 111.0 | Good | Viscosity poor, but good commerciality, powder rather than liquid smeared |
| B21 | 100.0 | 95.1 | 4.2 | 4.0 | 1.0 | 1.0 | 105.2 | Moderate poor | Viscosity very poor, too dispersive, powder smeared |

Working Examples C1 to C9

Synthetic clay compositions were prepared in the same manner as in Working Example A1, with the exception that 'Hollow Glass Microspheres H60' (manufactured by Sinosteel Maanshan New Material Technology Co., Ltd., China) having a density of 0.6 g/cm³ were used as the hollow glass spheres, and the ingredients were used as shown in Table 1d, below.

TABLE 1d

| Working Ex. | Hollow glass sphere Wt. (g) | Wt. % | Glycerin Wt. (g) | Wt. % | Coagulant Wt. (g) | Wt. % | Total Wt. | Commerciality | Remark |
|---|---|---|---|---|---|---|---|---|---|
| C1 | 120.0 | 35.9 | 200.0 | 59.9 | 14.0 | 4.2 | 334.0 | Poor | Glutinous phase (stretchy, impossible to use) |
| C2 | 120.0 | 40.7 | 160.0 | 54.2 | 15.0 | 5.1 | 295.0 | Poor | Glutinous and gummy |
| C3 | 120.0 | 50.9 | 100.0 | 42.4 | 16.0 | 6.8 | 236.0 | Poor | Gluey, tough gummy, highly viscous |
| C4 | 120.0 | 60.3 | 63.0 | 31.7 | 16.0 | 8.0 | 199.0 | Poor | Highly viscous, gummy sensation somewhat decreased, liquid smeared |
| C5 | 120.0 | 65.9 | 50.0 | 27.5 | 12.0 | 6.6 | 182.0 | Moderate | Highly viscous, liquid smeared |
| C6 | 120.0 | 70.6 | 43.0 | 25.3 | 7.0 | 4.1 | 170.0 | moderate good | Both liquid and powder coated hands, somewhat strong viscous clay, no soft tactile sensation |
| C7 | 120.0 | 80.0 | 25.0 | 16.7 | 5.0 | 3.3 | 150.0 | moderate poor | Too little viscosity, powder coated hands significantly |
| C8 | 120.0 | 90.2 | 11.0 | 8.3 | 2.0 | 1.5 | 133.0 | moderate poor | Too little viscous, powder coated hands significantly |
| C9 | 120.0 | 94.9 | 5.5 | 4.4 | 1.0 | 0.8 | 126.5 | moderate poor | Too little viscous, powder coated hands significantly |

Working Examples D1 to D12

Synthetic clay compositions were prepared in the same manner as in Working Example A1, with the exception that plastic hollow spheres were used instead of the hollow glass spheres and the ingredients were used as shown in Table 1e, below. As the plastic hollow spheres, Expancel® Microspheres 461 DET 40 d25 Model (manufactured by Akzo Nobel, Netherlands), made of an acryl copolymer, having a particle size (d0.5) of 35 to 55 µm and a net density of 25±3 kg/m³ was used. The flame retardant was accounted for by ESCON-773 (manufactured by ESC, Korea).

TABLE 1e

| Working Ex. | Plastic hollow sphere Wt. (g) | Wt. % | Glycerin Wt. (g) | Wt. % | Coagulant Wt. (g) | Wt. % | Total Wt. (exclusive of flame retardant) | Flame retardant Wt. (g) | Commerciality | Remark |
|---|---|---|---|---|---|---|---|---|---|---|
| D1 | 10.0 | 2.9 | 320.0 | 93.6 | 12.0 | 3.5 | 342.0 | 0.0 | Poor | Glutinous phase |
| D2 | 10.0 | 3.7 | 250.0 | 92.6 | 10.0 | 3.7 | 270.0 | 0.0 | Poor | Glutinous phase |
| D3 | 10.0 | 4.5 | 200.0 | 89.7 | 13.0 | 5.8 | 223.0 | 0.0 | Poor | Just before Glutinous phase |
| D4 | 10.0 | 13.0 | 60.0 | 77.9 | 7.0 | 9.1 | 77.0 | 38.5 | Moderate poor | Stretchy, tough, glycerin smeared significantly |

TABLE 1e-continued

| Working Ex. | Plastic hollow sphere Wt. (g) | Plastic hollow sphere Wt. % | Glycerin Wt. (g) | Glycerin Wt. % | Coagulant Wt. (g) | Coagulant Wt. % | Total Wt. (exclusive of flame retardant) | Flame retardant Wt. (g) | Commerciality | Remark |
|---|---|---|---|---|---|---|---|---|---|---|
| D5 | 10.0 | 19.8 | 36.0 | 71.3 | 4.5 | 8.9 | 50.5 | 25.3 | Moderate poor | Tough gummy, highly viscous, somewhat softer and drier than Ex. D1, glycerin smeared |
| D6 | 10.0 | 26.7 | 24.0 | 64.2 | 3.4 | 9.1 | 37.4 | 18.7 | Moderate | Viscosity higher than Ex. D2, gummy, glycerin smeared to a lesser degree |
| D7 | 10.0 | 28.4 | 22.0 | 62.5 | 3.2 | 9.1 | 35.2 | 17.6 | Moderate good | Glycerin smeared to lesser degree than Ex. D3, soft and dry sensation rather than gummy sensation |
| D8 | 10.0 | 30.3 | 20.0 | 60.6 | 3.0 | 9.1 | 33.0 | 16.5 | Good | Glycerin smeared to lesser degree than Ex. D4, soft and dry sensation |
| D9 | 10.0 | 31.3 | 19.0 | 59.6 | 2.9 | 9.1 | 31.9 | 16.0 | Good | Glycerin smeared to lesser degree than Ex. D5, soft and dry sensation best |
| D10 | 10.0 | 45.5 | 10.0 | 45.5 | 2.0 | 9.1 | 22.0 | 11.0 | Good | Glycerin smeared to lesser degree than Ex. D6, powder coated hands |
| D11 | 10.0 | 60.6 | 5.0 | 30.3 | 1.5 | 9.1 | 16.5 | 8.3 | Moderate | Viscosity far lower than Ex. D1 to D7, but not too poor to use, powder coated hands |
| D12 | 10.0 | 82.6 | 1.0 | 8.3 | 1.1 | 9.1 | 12.1 | 6.1 | Poor | Powdery state |

Working Examples A10 to A12

Viscous synthetic clay compositions were prepared in the same manner as in Working Example A1, with the exception that the ingredients were used as shown in Table 2, below.

Working Examples B10 to B12

Viscous synthetic clay compositions were prepared in the same manner as in Working Example B1, with the exception that the ingredients were used as shown in Table 2, below.

Working Examples C10 to C12

Viscous synthetic clay compositions were prepared in the same manner as in Working Example C1, with the exception that the ingredients were used as shown in Table 2, below.

TABLE 2

| Working Ex. | Hollow glass sphere Wt. (g) | Hollow glass sphere Wt. % | Glycerin Wt. (g) | Glycerin Wt. % | Coagulant Wt. (g) | Coagulant Wt. % | Total Wt. |
|---|---|---|---|---|---|---|---|
| A10 | 113.0 | 66.9 | 46.0 | 27.2 | 10.0 | 5.9 | 169.0 |
| A11 | 119.0 | 70.0 | 40.8 | 24.0 | 10.2 | 6.0 | 170.0 |
| A12 | 108.0 | 63.8 | 51.0 | 30.1 | 10.2 | 6.0 | 169.2 |
| B10 | 250.0 | 85.3 | 25.0 | 8.5 | 18.0 | 6.1 | 293.0 |
| B11 | 142.0 | 84.0 | 17.0 | 10.1 | 10.0 | 5.9 | 169.0 |
| B12 | 148.0 | 87.1 | 11.9 | 7.0 | 10.0 | 5.9 | 169.9 |
| C10 | 160.0 | 80.0 | 34.0 | 17.0 | 6.0 | 3.0 | 200.0 |
| C11 | 132.6 | 78.0 | 32.3 | 19.0 | 5.1 | 3.0 | 170.0 |
| C12 | 139.4 | 82.0 | 25.5 | 15.0 | 5.1 | 3.0 | 170.0 |

Working Examples D13 to D15

Viscous synthetic clay compositions were prepared in the same manner as in Working Example D1, with the exception of mixing as shown in Table 3.

TABLE 3

| Working Ex. | Plastic hollow sphere Wt. (g) | Plastic hollow sphere Wt. % | Glycerin Wt. (g) | Glycerin Wt. % | Coagulant Wt. (g) | Coagulant Wt. % | Total Wt. (exclusive of flame retardant) | Flame retardant Wt. (g) |
|---|---|---|---|---|---|---|---|---|
| D13 | 38.0 | 27.5 | 86.5 | 62.6 | 13.7 | 9.9 | 138.2 | 82.9 |
| D14 | 40.6 | 29.6 | 84.0 | 61.2 | 12.6 | 9.2 | 137.2 | 82.2 |
| D15 | 42.5 | 31.3 | 80.9 | 59.6 | 12.3 | 9.1 | 135.8 | 81.5 |

Comparative Examples 1 to 13

Thirteen different, commercially available synthetic clay products listed in Table 4 were purchased.

TABLE 4

| Comparative Ex. | Company | Trade name |
|---|---|---|
| 1 | SPIN MASTER | MOON DOUGH SINGLE REFILL |
| 2 | DELTASAND (DELTA OF SWEDEN) | Deltasand |
| 3 | SPIN MASTER | Kinetic sand |
| 4 | DELTASAND(DELTA OF SWEDEN) | Bubber |
| 5 | IWILLFANCY | IFUN Octonauts sand play |
| 6 | DONERLAND | PPosongi sand |
| 7 | IRWIN TOY | SKWOOSHI |
| 8 | MCA | S/A(SANDS ALIVE!) |
| 9 | DONERLAND | Colorclay |
| 10 | AMOS | iCLAY |
| 11 | DONERLAND | AngelClay |
| 12 | COMEBIMBO | Boryeong MudSand |
| 13 | CRAYWORLD | Jumping clay |

Comparative Example 14

A synthetic clay composition was prepared according to the composition and method described in Example 1 of Korean Patent Publication No. 2006-11619 in which hollow polyacrylonitrile powder was used as a base material.

Test Examples

The synthetic clay compositions prepared in Working Examples A1 to A12, B1 to B21, C1 to C12, and D13 to D15 were tested for various properties.

Microscopic Observation

Microscopic observation was made to see whether the hollow glass spheres and the liquid material were evenly mixed and kneaded to form stable homogeneous phases in the Working Examples. For this, a Nikon optical microscope was used with 100× and 200× magnification. Polarized light was employed to give a contrast, thus ensuring discrimination between the glass spheres and the liquid material. In the microscopic images, the liquid material appears to be black while the hollow glass spheres look bright and round. The degree of mixing between the hollow glass spheres and liquid material was evaluated with the microscopic images.

As the degree of mixing increased from a low level to a high level, the deposition of the liquid material on the hollow glass spheres was gradually intensified.

Figure 2A:
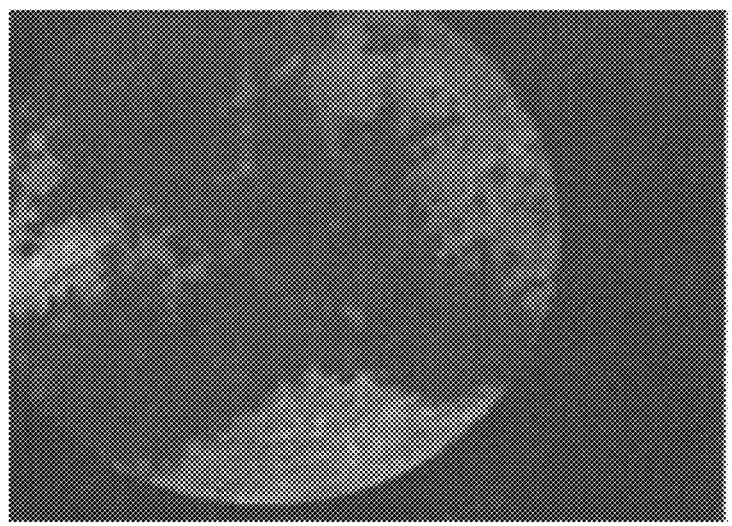
FIGS. 2A and 2B are optical microscopic images of a mixture of hollow spheres and a liquid material in accordance with embodiments of the present invention.
Figure 2B:
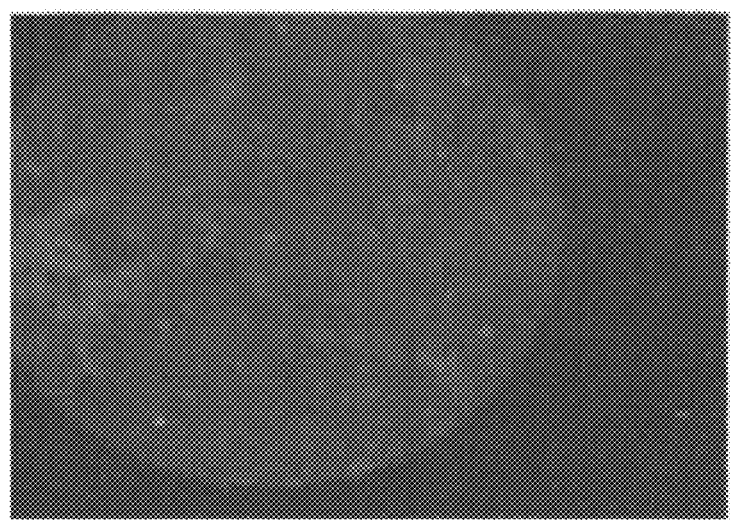

FIGS. 2A and 2B are microscopic images of a mixture of the hollow glass spheres 'Hollow Glass Microspheres H20' having a density of 0.2 g/cm$^3$ and the liquid material glycerin in accordance with an embodiment of the present invention, with 100× and 200× magnification, respectively. No independent hollow glass spheres were observed as the liquid material was evenly deposited on the surface of the hollow glass spheres. That is, in the synthetic clay composition according to an embodiment of the present invention, the hollow spheres and the liquid material were mixed and kneaded to form a stable homogeneous phase.

Contact Angle Measurement

The contact angle measurement was to analyze samples or liquids for physical properties and surface states through contact angle and wetting energy. In the present invention, effects attributed to interaction between borosilicate and glycerin were evaluated using contact angle measurement. The instrument used to measure contact angles was Phoenix 300 (manufactured by SEO, Korea). A 2 μm cylinder needle was used. First, samples including borosilicate glass, slide glass, and quartz were washed for 30 min using ultrasonication. After wash, drops of glycerin were loaded using the cylinder needle. Measurement results of contact angles and wetting energy between the samples and glycerin are depicted in FIG. 3 and summarized in Table 5, below.

TABLE 5

| | Borosilicate glass | | Slide glass | | Quartz | |
|---|---|---|---|---|---|---|
| | Contact angle (°) | Wetting energy (Nm) | Contact angle (°) | Wetting energy (Nm) | Contact angle (°) | Wetting energy (Nm) |
| Glycerin | 25.37 | 65.77 | 51.88 | 44.93 | 43.54 | 52.76 |

As can be seen from data of FIG. 3 and Table 5, a smaller contact angle was measured when glycerin was in contact with borosilicate glass rather than the other samples, thus facilitating wetting. This experiment revealed that because the reactivity of glycerin (liquid material) to the surface of the hollow glass spheres used in the Working Examples of the present invention is relatively high, these ingredients were easily mixed and kneaded to form a stable homogeneous phase.

Sensory Test

The synthetic clay compositions of Working Examples A1 to A9, B1 to B9, B13 to B21, C1 to C9, and D1 to D12 according to the present invention were evaluated for the degrees of smearing the hands, crumbling, and dust production through sensory tests. Based on the entire sensory test results, overall commerciality was classified as being poor, moderately poor, moderate, moderately good, and good. The moderately poor level or higher was evaluated to be suitable for commercialization. Results of the sensory test are summarized in Tables 1A to 1E.

As can be seen in Tables 1A to 1E, the clay composition increased in viscosity with the increase of the content of the liquid material glycerin. When about 50 to about 95% by weight of the hollow glass spheres and about 4 to about 50% by weight of glycerin were mixed, based on the total weight of the composition, the overall desired properties of the synthetic clay composition were preferably obtained. When plastic hollow spheres were employed, a mixture of about 10 to about 65% by weight of plastic hollow spheres and about 30 to about 80% by weight of the liquid material on the basis of the total weight of the composition (flame retardant exclusive if present) was observed to impart preferable overall physical properties to the synthetic clay composition.

Comparison of Working Examples and Comparative Examples

Comparison between Working Examples A10 to A12, B10 to B12, C10 to C12, and D13 to D15, and Comparative Examples 1 to 14 was made with regard to the following properties.

Density Measurement

In order to examine how light the clay compositions were and how great the extent is to which the clay compositions changed in density after being left at room temperature for a long period of time, measurement was made of density. An appropriate volume of each of the clay compositions of the Working Examples and the Comparative Examples (for Comparative Examples except Comparative Example 14, contents withdrawn from the purchased product articles after their package boxes were opened) was repeatedly charged into a cylindrical mold with a diameter of 15 mm and a height of 25 mm by pressing until the content of the compositions exceeded the height of the mold so as to leave no voids in the mold. The part of the composition exceeding the mold was slowly removed using a knife which was maintained to keep very close contact with the top surface of the mold. After the cut face thereof was trimmed, the composition was withdrawn from the mold to give a sample for density measurement (see FIG. 4). The sample's weight was measured to the extent of four decimal points, and the sample was measured for diameter and height using a Vernier calipers to calculate the volume of the sample. The density was calculated by the measured weight of the sample by the volume.

Figure 5B:
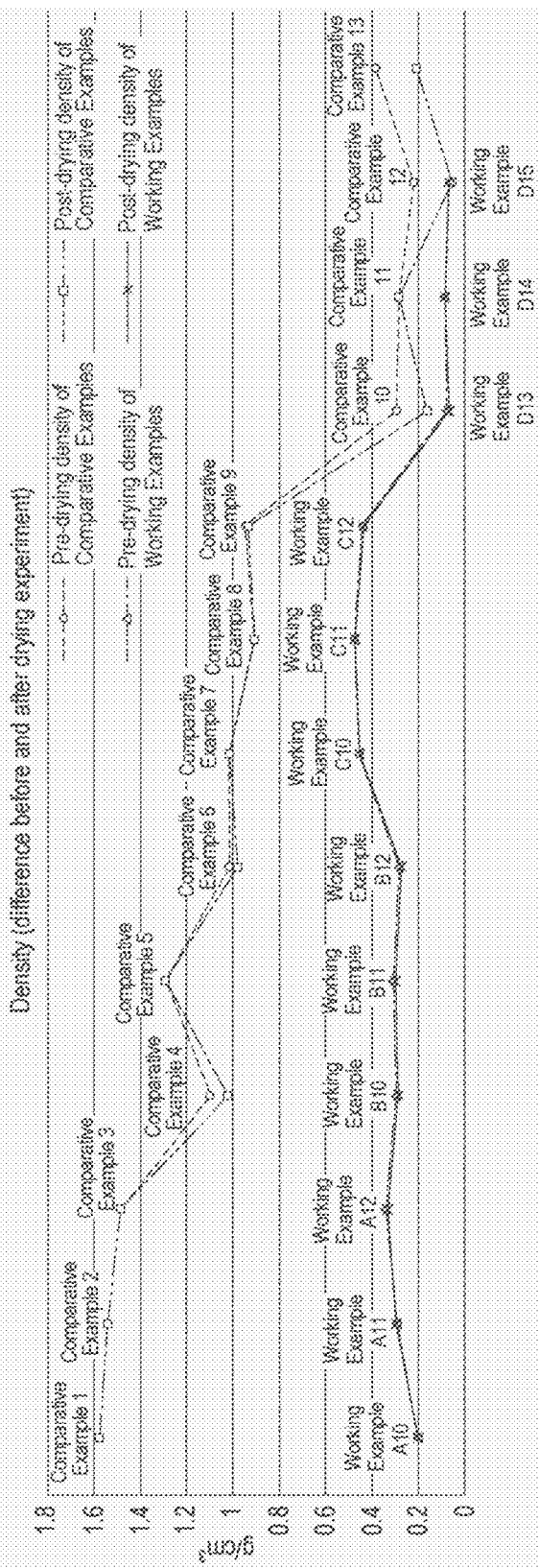

The sample was dried for 96 hours at 25° C., and measured for weight and volume as described above. Post-drying test density was calculated. Ten samples for each of the compositions of the Working Examples and the Comparative Examples were prepared and measured for density, and average values of the measurements are shown in FIG. 5A and FIG. 5B.

Samples from Comparative Examples 1 to 9 had a density as high as or higher than 0.9 g/cm$^3$ whereas samples from Working Examples A10 to A12, B10 to B12, C10 to C12, and D13 to D15 had a density as low as or lower than 0.6 g/cm$^3$. Of them, samples from Working Examples A10 to A12, and B10 to B12 had a density as low as or lower than 0.4 g/cm$^3$, and samples from D13 to D15 had a density as low as or lower than 0.2 g/cm$^3$.

Meanwhile, the compositions of all the Working Examples changed in density within 10% before and after the drying test so that they did not harden, but remained almost intact even after they were long dried or left alone. In contrast, the compositions of Comparative Examples 10, 12, and 13 exhibited very large density changes to the extent of 45.13%, 74.58%, and 45.64%, respectively, and hardened. Thus, the compositions were considered to contain significant amounts of ingredients, which have high density and are easily vaporizable.

Because the synthetic clay composition prepared according to Comparative Example 14 was identified to be the same as that of Comparative Example 13, results of this experiment and the following comparative experiments for the synthetic clay composition of Comparative Example 14 were omitted.

Solubility Measurement

In order to examine ease of washing and toxicity to the human body, the clay compositions were measured for solubility in five solvents. In 5 ml of each of acetone, toluene, hexane, ethyl alcohol, and distilled water was placed 2 g of each of the clay compositions, followed by observation for 10 min with the naked eye to examine whether the clay compositions were dissolved. For the clay compositions having a density of 0.1 g/cm$^3$ or lower, 10 ml of each of the solvents were used.

Figure 6:
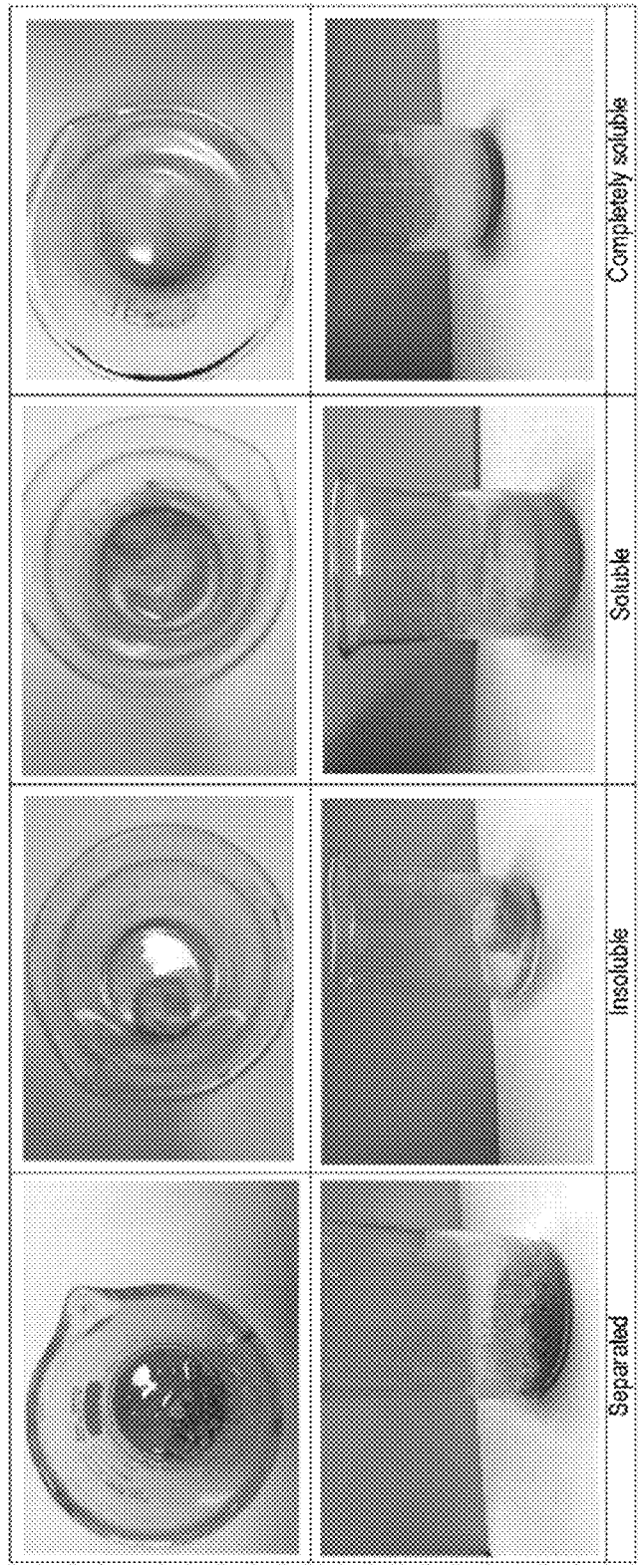
FIG. 6 shows photographic images accounting for solubility-dependent different states of synthetic clay compositions.

In the present invention, the state that solute particles were dispersed across a solvent, with individual particles observed to some degree was regarded as "dissolved" whereas the state that mixing was done such that individual particles could not be discriminated was regarded as "completely dissolved". Concrete evaluation criteria are as shown in Table 6, below, and photographic images of the states of synthetic clay compositions according to solubility are depicted in FIG. 6.

TABLE 6

| Solubility | State |
|---|---|
| ○ (dissolved) | Dissolved with time, particles visible |
| ◉ (completely dissolved) | Dissolved as soon as compositions are added to solvents. Particles invisible. |
| □ (insoluble) | Not reactive |
| Δ (separated) | Not dissolved, sample separated. |

Experiment results according to the evaluation criteria are summarized in Table 7, below.

TABLE 7

| | Comparative Example | | | | | | | | | | | | |
|---|---|---|---|---|---|---|---|---|---|---|---|---|---|
| Solvent | 1 | 2 | 3 | 4 | 5 | 6 | 7 | 8 | 9 | 10 | 11 | 12 | 13 |
| D.W. | □ | □ | □ | ○ | □ | ◉ | □ | ◉ | ◉ | ◉ | □ | ◉ | ○ |
| Ethyl alcohol | Δ | □ | Δ | Δ | ○ | Δ | □ | ◉ | ◉ | ◉ | Δ | Δ | □ |
| Acetone | Δ | □ | Δ | Δ | Δ | □ | □ | Δ | □ | ◉ | Δ | □ | □ |
| Toluene | ◉ | Δ | Δ | □ | ○ | □ | □ | □ | □ | □ | ◉ | □ | □ |
| Hexane | ◉ | Δ | Δ | □ | ○ | □ | □ | □ | □ | □ | ○ | □ | □ |
| Xylene | ◉ | Δ | Δ | □ | ○ | □ | □ | □ | □ | □ | ○ | □ | □ |

TABLE 7-continued

| | Working Example | | | | | | | | | | | |
|---|---|---|---|---|---|---|---|---|---|---|---|---|
| Solvent | A10 | A11 | A12 | B10 | B11 | B12 | C10 | C11 | C12 | D13 | D14 | D15 |
| D.W. | ○ | ○ | ○ | ○ | ○ | ○ | ○ | ○ | ○ | ◉ | ◉ | ◉ |
| Ethyl alcohol | □ | □ | □ | □ | □ | □ | □ | □ | □ | Δ | Δ | Δ |
| Acetone | □ | □ | □ | □ | □ | □ | □ | □ | □ | ○ | Δ | Δ |
| Toluene | □ | □ | □ | □ | □ | □ | □ | □ | □ | □ | □ | □ |
| Hexane | □ | □ | □ | □ | □ | □ | □ | □ | □ | □ | □ | □ |
| Xylene | □ | □ | □ | □ | □ | □ | □ | □ | □ | □ | □ | □ |

Figure 7:
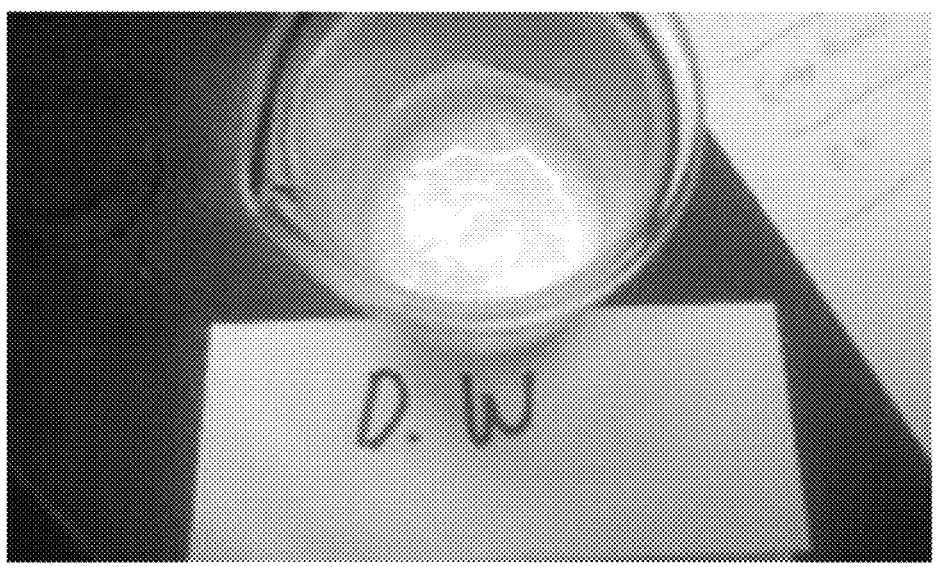
FIG. 7 is a photographic image showing the dissolved synthetic clay composition according an embodiment of the present invention in distilled water.

As seen in Table 7, the clay compositions of Comparative Examples 1 to 3, 5, 7, and 11 were not dissolved in distilled water whereas the clay compositions of all of the Working Examples were dissolved in distilled water. FIG. 7 shows the dissolved synthetic clay compositions of the Working Examples of the present invention in distilled water, with clay particles dispersed and homogeneously mixed in the distilled water. It was revealed from the experiment results that the synthetic clay compositions of all of the Working Examples are water soluble.

Morphological Change Experiment

Figure 8A:
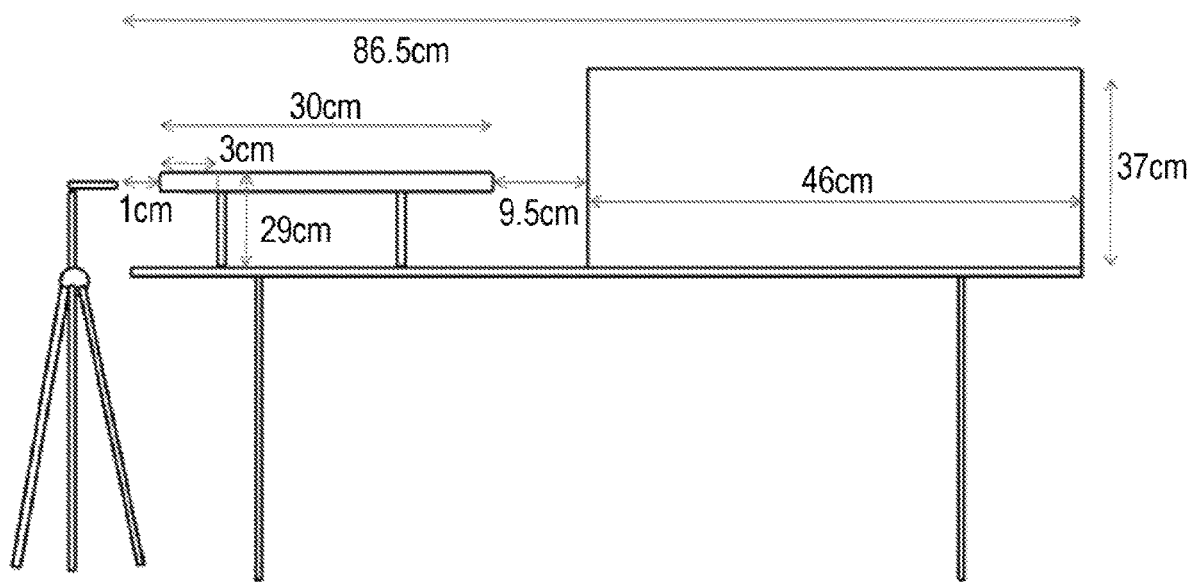
FIGS. 8A and 8B are schematic diagrams of a morphological change experiment apparatus, from a side view and a top view.
Figure 8B:
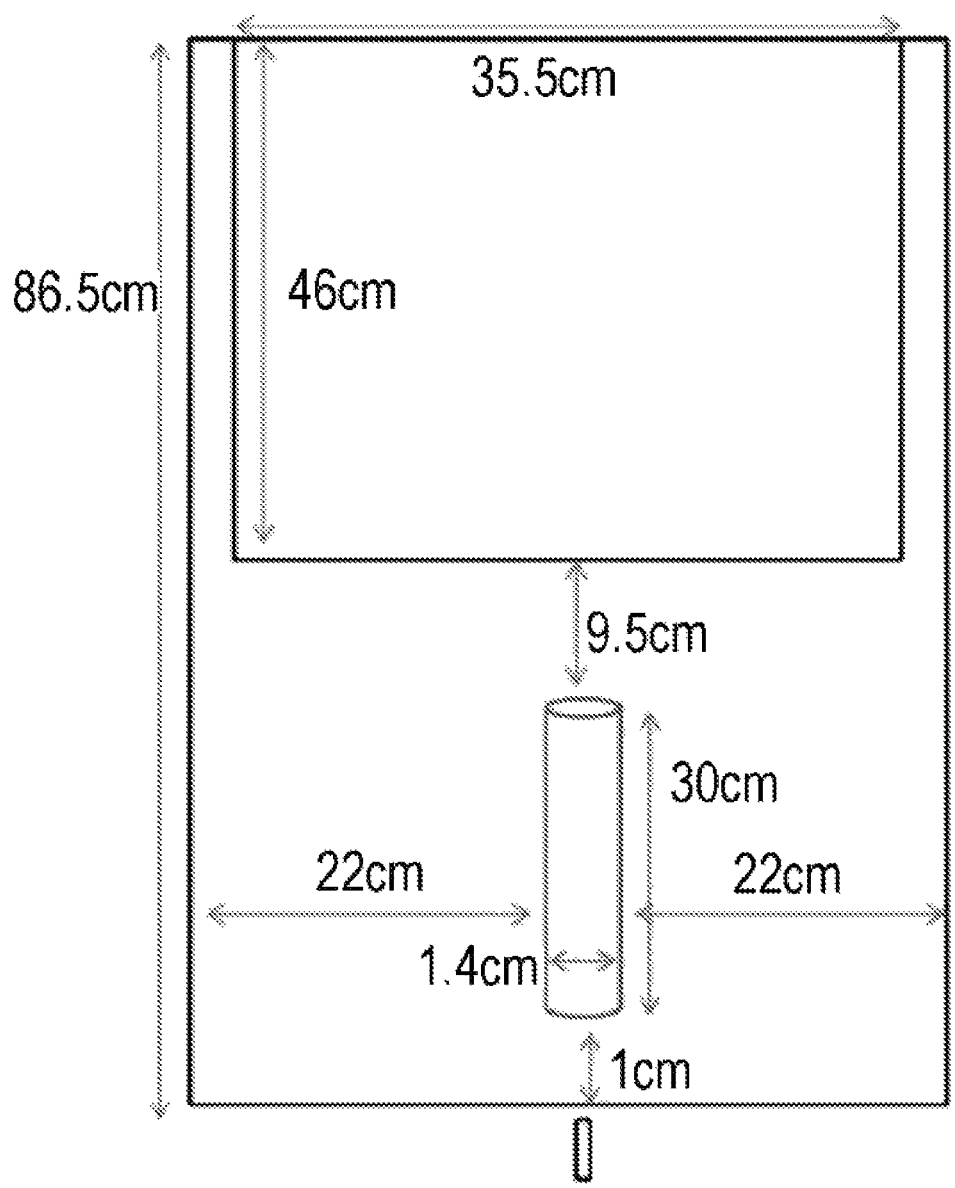

In the morphological change experiment, measurement was made of the extent to which the clay compositions were crumbled by an external force from an air compressor. This experiment was conducted in order to examine the extent to which the molded clay compositions maintained their shapes without producing dust or crumbling during a play therewith. In FIGS. 8A and 8B, schematic diagrams with rough dimensions of the morphological change experiment installment are shown. In this experiment, a pipe (acryl pipe) with an inner diameter of 1.4 cm, an outer diameter of 2.0 cm and a length of 30 cm was used. The reason of using the pipe 1.4 cm in inner diameter and 2.0 cm in outer diameter is to measure the extent of crumbling on the basis of the product size accounting for fineness (a range in which fine details could be expressed for sculpturing).

Using a microbalance, ten samples of each of the clay compositions from the Working Examples and Comparative Examples were allowed to have respective weights identical within an error range of 0.01 g (see Table 8, below). In this regard, the amount of each sample was determined such that the sample was not crumbled when it was loaded into an acryl pipe. However, since the clay compositions from the Working Examples and the Comparative Examples might be different in density from one another, all the samples from the Working Examples and the Comparative Examples might not be identical. A sample was picked up using forceps and placed at a position 3 cm distant from the end of the acryl pipe (an error range of 0.5 cm). Then, an air gun was set to inject air at a pressure of 8.5 MPa (an error range of 0.5 MPa). Upon injecting air, the sample was bumped against the inner wall of the rectangular acryl plate, and the heaviest one of the resulting crumbled fragments was picked up using forceps and weighed. When it was impossible to discriminate with the naked eye, individual fragments were weighed and the weight of the heaviest fragment was listed. Weight reduction after the experiment was calculated as percentages. Smaller weight reduction after air injection means break to a lesser degree. No weight reduction was expressed as 0%. The experiment results are depicted in FIG. 9A.

In order to observe the degree of crumbling depending on the weight of the sample, an experiment was conducted under the same condition as described above, with the exception that a sample was different in weight from that prepared above. The sample was 1.3- to 1.5-fold heavier than that prepared above (see Table 8, below). The results of this experiment is shown in FIG. 9B.

TABLE 8

| Weight of Products measured in Experiment 1 (g) | | | | Weight of Products measured in Experiment 2 (g) | | | |
|---|---|---|---|---|---|---|---|
| Comparative Ex. | | Working Ex. | | Comparative Ex. | | Working Ex. | |
| 1 | 0.200 | A10 | 0.200 | 1 | 0.300 | A10 | 0.300 |
| 2 | 0.800 | A11 | 0.200 | 2 | 1.200 | A11 | 0.300 |
| 3 | 0.800 | A12 | 0.200 | 3 | 1.200 | A12 | 0.300 |
| 4 | 0.600 | B10 | 0.200 | 4 | 0.900 | B10 | 0.300 |
| 5 | 0.900 | B11 | 0.200 | 5 | 1.350 | B11 | 0.300 |
| 6 | 0.600 | B12 | 0.200 | 6 | 0.900 | B12 | 0.300 |
| 7 | 0.800 | C10 | 0.200 | 7 | 1.200 | C10 | 0.300 |
| 8 | 0.600 | C11 | 0.200 | 8 | 0.900 | C11 | 0.300 |
| 9 | 0.700 | C12 | 0.200 | 9 | 1.050 | C12 | 0.300 |
| 10 | 0.300 | D13 | 0.050 | 10 | 0.450 | D13 | 0.075 |
| 11 | 0.200 | D14 | 0.050 | 11 | 0.300 | D14 | 0.075 |
| 12 | 0.800 | D15 | 0.050 | 12 | 1.500 | D15 | 0.075 |
| 13 | 0.300 | | | 13 | 0.400 | | |

As shown in FIGS. 9A and 9B, a large weight reduction occurred in most of the clay compositions from the Comparative Examples after the morphological change experiment, indicating that the sculptures molded from the compositions are highly apt to crumble or to produce dust by an external force. In contrast, all of the clay compositions from the Working Examples exhibited weight reduction within 2%. Most of them did not undergo weight reduction. These results suggest that the synthetic clay compositions of the present invention have very good shape retention potential.

As found through the experiment results, conventional synthetic clay compositions, unlike the synthetic clay compositions of the present invention, cannot simultaneously meet the requirements for water solubility, low density, and a small density change before and after a drying test, and thus are limited in utility. In contrast, the synthetic clay composition of the present invention is water soluble, easy to wash, highly safe for the human body, and very light with a density ranging from greater than 0 g/cm$^3$ to 0.6 g/cm$^3$. Further, the clay compositions of the present invention exhibit a density change of 10% or less after a drying test so that they can be used as play clay that can be repeatedly molded into various shapes even after being dried or left for a long period of time. Having an excellent shape retention potential, the clay compositions of the present invention can also maintain a molded shape without change for a long time and allows play such as throwing with agglomerates of the clay.

The synthetic clay composition of the present invention retains various properties including those of light and viscous clay, malleable soil, sand, etc. and thus can be used broadly for play, education, and sculpturing, instead of conventional clay, sand, clay, rubber clay, and paper clay.

The invention claimed is:

1. A synthetic clay composition comprising:
   hollow glass spheres; and
   a liquid material comprising glycerin capable of being kneaded together with the hollow glass spheres;
   wherein the clay composition is water soluble and has a density range of from greater than 0 g/cm$^3$ to 0.6 g/cm$^3$, with a density change of 10% or less before and after a drying test;
   wherein the hollow glass spheres are present in an amount of about 50 to about 95% by weight based on a total weight of the composition; and
   wherein the glycerin is present in an amount of about 4 to about 50% by weight based on a total weight of the composition.

2. The synthetic clay composition of claim 1, wherein the synthetic clay composition exhibits a weight change of 2% or less before and after a morphological change experiment.

3. The synthetic clay composition of claim 1, wherein the synthetic clay composition has a density range of from greater than 0 g/cm$^3$ to 0.4 g/cm$^3$.

4. The synthetic clay composition of claim 1, wherein the synthetic clay composition has a density range of from greater than 0 g/cm$^3$ to 0.2 g/cm$^3$.

5. The synthetic clay composition of claim 1, wherein the hollow glass spheres have a density of from greater than 0 g/cm$^3$ to 0.6 g/cm$^3$.

6. The synthetic clay composition of claim 1, wherein the hollow glass spheres have a density of from greater than 0 g/cm$^3$ to 0.4 g/cm$^3$.

7. The synthetic clay composition of claim 1 further comprising a flame retardant.

8. A synthetic clay composition comprising:
   hollow plastic spheres;
   a liquid material comprises comprising glycerin capable of being kneaded together with the hollow plastic spheres; and
   optionally a flame retardant;
   wherein the clay composition is water soluble and has a density range of from greater than 0 g/cm$^3$ to 0.6 g/cm$^3$, with a density change of 10% or less before and after a drying test;
   wherein the hollow plastic spheres are present in an amount of about 10 to about 65% by weight based on a total weight of the composition exclusive of any flame retardant; and
   wherein the glycerin is present in an amount of about 30 to about 80% by weight based on a total weight of the composition exclusive of any flame retardant.

9. The synthetic clay composition of claim 8, wherein the synthetic clay composition exhibits a weight change of 2% or less before and after a morphological change experiment.

10. A synthetic clay composition comprising:
    hollow spheres;
    a liquid material capable of being kneaded together with the hollow spheres; and
    a coagulant;
    wherein the clay composition is water soluble and has a density range of from greater than 0 g/cm$^3$ to 0.6 g/cm$^3$, with a density change of 10% or less before and after a drying test.

11. The synthetic clay composition of claim 10, wherein the coagulant is present in an amount in the range of from greater than 0% by weight to about 10% by weight, based on a total weight of the composition.

12. The synthetic clay composition of claim 10 further comprising a flame retardant.

13. The synthetic clay composition of claim 10, wherein the synthetic clay composition exhibits a weight change of 2% or less before and after a morphological change experiment.

14. The synthetic clay composition of claim 10, wherein the hollow spheres have a density of less than 0.6 g/cm$^3$.

15. A synthetic clay composition comprising:
    hollow spheres;
    a liquid material capable of being kneaded together with the hollow spheres; and
    an antibacterial material comprising a porous substance impregnated with silver ions;
    wherein the clay composition is water soluble and has a density range of from greater than 0 g/cm$^3$ to 0.6 g/cm$^3$, with a density change of 10% or less before and after a drying test;
    wherein the porous substance contains one of diatomite, zeolite, and perlite; and
    wherein the antibacterial material is contained in an amount of about 0.5% by weight or greater based on a total weight of the composition.

16. The synthetic clay composition of claim 15 further comprising a flame retardant.

17. The synthetic clay composition of claim 15, wherein the synthetic clay composition exhibits a weight change of 2% or less before and after a morphological change experiment.

18. The synthetic clay composition of claim 15, wherein the hollow spheres have a density of less than 0.6 g/cm$^3$.

19. A synthetic clay composition comprising:
    hollow spheres;
    a liquid material capable of being kneaded together with the hollow spheres;
    a coagulant in an amount less than about 10% by weight based on a total weight of the composition; and
    an antibacterial material in an amount of greater than about 0.5% by weight or greater based on a total weight of the composition;
    wherein the clay composition is water soluble and has a density range of from greater than 0 g/cm$^3$ to 0.6 g/cm$^3$, with a density change of 10% or less before and after a drying test; and
    wherein the hollow spheres have a density less than 0.4 g/cm$^3$.

20. The synthetic clay composition of claim 19, wherein the synthetic clay composition exhibits a weight change of 2% or less before and after a morphological change experiment.

* * * * *